United States Patent
Uehara

(10) Patent No.: US 7,320,949 B2
(45) Date of Patent: *Jan. 22, 2008

(54) OPTICAL GLASS

(75) Inventor: Susumu Uehara, Sagamihara (JP)

(73) Assignee: Kabushiki Kaisha Ohara, Kanagawa-ken (JP)

( * ) Notice: Subject to any disclaimer, the term of this patent is extended or adjusted under 35 U.S.C. 154(b) by 609 days.

This patent is subject to a terminal disclaimer.

(21) Appl. No.: 10/859,022

(22) Filed: Jun. 2, 2004

(65) Prior Publication Data

US 2004/0220040 A1 Nov. 4, 2004

Related U.S. Application Data

(63) Continuation-in-part of application No. 10/404,788, filed on Apr. 1, 2003, now Pat. No. 6,828,265.

(30) Foreign Application Priority Data

Apr. 2, 2002 (JP) ............... 2002-099810
Sep. 27, 2002 (JP) ............... 2002-282336

(51) Int. Cl.
C03C 3/062 (2006.01)
C03C 3/068 (2006.01)
C03C 4/00 (2006.01)

(52) U.S. Cl. ............... 501/73; 501/78; 501/901

(58) Field of Classification Search ............ 501/63–65, 501/73, 77, 78, 901, 79
See application file for complete search history.

(56) References Cited

U.S. PATENT DOCUMENTS

| 3,870,531 | A | * | 3/1975 | Jahn ............... 501/60 |
| 3,877,953 | A | * | 4/1975 | Broemer et al. ............... 501/75 |
| 4,084,978 | A | * | 4/1978 | Sagara ............... 501/63 |
| 4,213,787 | A | * | 7/1980 | Faulstich et al. ............... 501/74 |
| 4,612,295 | A | * | 9/1986 | Sagara ............... 501/51 |
| 4,734,389 | A | * | 3/1988 | Grabowski et al. ............... 501/73 |
| 4,742,028 | A | * | 5/1988 | Boudot et al. ............... 501/78 |
| 6,268,303 | B1 | * | 7/2001 | Aitken et al. ............... 501/63 |
| 6,413,894 | B1 | * | 7/2002 | Sato ............... 501/77 |

FOREIGN PATENT DOCUMENTS

DE    19919802 A1 * 11/1999

* cited by examiner

*Primary Examiner*—J. A. Lorengo
*Assistant Examiner*—Elizabeth A. Bolden
(74) *Attorney, Agent, or Firm*—Hedman & Costigan; James V. Costigan

(57) ABSTRACT

An optical glass suitable for precision mold pressing has a refractive index (nd) of 1.88 or over and an Abbe number (ν d) within a range from 22 to 28, comprises, in mass %,

| | |
|---|---|
| $SiO_2$ | 15-25% |
| $B_2O_3$ | 0-5% |
| $La_2O_3$ | 0-5% |
| $TiO_2$ | 5-15% |
| $ZrO_2$ | 0-10% |
| $Nb_2O_5$ | more than 30% and less than 50% |
| $WO_3$ | 0-5% |
| CaO | 0-10% |
| BaO | 0-10% |
| $Li_2O$ | 3-12% |
| $Na_2O$ | 0-10% |
| $K_2O$ | 0-10% |
| $Bi_2O_3$ | 0-15% |
| $Ta_2O_5$ | 0-7% | and has a glass transition point (Tg) within a range from 500° C. to 580° C. The optical glass preferably has a yield point (At) within a range from 550° C. to 640° C.

4 Claims, No Drawings

OPTICAL GLASS

This application is a continuation-in part of Ser. No. 10/404,788 filed Apr. 1, 2003, now U.S. Pat. No. 6,828,265, which claims priority to Japanese Application Serial No. 2002-099810 filed Apr. 2, 2002 and Japanese Application Serial No. 2002-282336 filed Sep. 27, 2002.

BACKGROUND OF THE INVENTION

This invention relates to an optical glass which has optical constants of a refractive index (nd) of 1.88 or over and an Abbe number (ν d) within a range from 22 to 28 and is suitable for precision mold pressing A typical optical glass having a high refractive index is one which contains a large quantity of lead oxide. Since this type of optical glass is stable because of having high resistance to devitrification and has a low glass transition point (Tg), it has been used for precision mold pressing. For example, Japanese Patent Application Laid-open Publlication No. 1-308843 discloses an optical glass suited for precision mold pressing which comprises a large quantity of lead oxide.

Since, however, an environment in which precision mold pressing is performed is kept in a reducing atmosphere for preventing oxidization of the mold, reduced lead precipitates from the surface of a glass if the glass contains lead oxide and this precipitating lead is deposited on the surface of the mold with the result that difficulty arises in maintaining the precision surface of the mold. Further, lead oxide is detrimental to the environment and hence a lead-free optical glass has been desired for.

Japanese Patent Application Laid-open Publication No. 52-45612 discloses an optical glass of a $SiO_2$—$Nb_2O_5$—RO—$R_2O$ system which is free of lead oxide. The refractive index (nd) of this optical glass, however, is within a range from 1.61 to 1.80.

Japanese Patent Application Laid-open Publication No. 2000-16830 discloses an optical glass which does not contain lead oxide, has a refractive index (nd) of 1.7 or over and has a yield point of 580° C. or below. In this publication, however, there is no disclosure of a specific example which has a refractive index (nd) of 1.88 or over.

It is an object of the present invention to eliminate the disadvantages of the prior art optical glasses and provide an optical glass suited for precision mold pressing which has a high refractive index (nd) of 1.88 or over and an Abbe number (ν d) within a range from 22 to 28 and also has a low glass transition point (Tg).

SUMMARY OF THE INVENTION

Laborious studies and experiments made by the inventors of the present invention for achieving the above described object of the invention have resulted in the finding, which has led to the present invention, that an optical glass having a glass transition point (Tg) within a range from 500° C. to 580° C. and a yield point (At) within a range from 550° C. to 640° C., being free of a substance which is detrimental to the environment, and has an excellent capability for precision mold pressing can be obtained in an optical glass having optical constants of a refractive index (nd) within a range from 1.88 to 1.93 and an Abbe number within a range from 22 to 28.

For achieving the object of the invention, there is provided an optical glass having a refractive index (nd) of 1.88 or over and an Abbe number (ν d) within a range from 22 to 28, comprising, in mass %,

| | |
|---|---|
| $SiO_2$ | 15-25% |
| $B_2O_3$ | 0-5% |
| $La_2O_3$ | 0-5% |
| $TiO_2$ | 5-15% |
| $ZrO_2$ | 0-10% |
| $Nb_2O_5$ | more than 30% and less than 50% |
| $WO_3$ | 0-5% |
| CaO | 0-10% |
| BaO | 0-10% |
| $Li_2O$ | 3-12% |
| $Na_2O$ | 0-10% |
| $K_2O$ | 0-10% |
| $Bi_2O_3$ | 0-15% |
| $Ta_2O_5$ | 0-7% | and having a glass transition point (Tg) within a range from 500° C. to 580° C.

In one aspect of the invention, there is provided an optical glass having a refractive index (nd) of 1.88 or over and an Abbe number (ν d) within a range from 22 to 28, comprising, in mass %,

| | |
|---|---|
| $SiO_2$ | 15-25% |
| $B_2O_3$ | 0-5% |
| $La_2O_3$ | 0-5% |
| $TiO_2$ | 5-15% |
| $ZrO_2$ | 0-10% |
| $Nb_2O_5$ | more than 30% and less than 50% |
| $WO_3$ | 0-5% |
| CaO | 0-10% |
| BaO | 0-10% |
| $Li_2O$ | 3-12% |
| $Na_2O$ | 0-10% |
| $K_2O$ | 0-10% |
| $Bi_2O_3$ | 0-15%, | being free of $Al_2O_3$ and having a glass transition point (Tg) within a range from 500° C. to 580° C.

In another aspect of the invention, the optical glass has a yield point (At) within a range from 550° C. to 640° C.

The optical glass according to the invention has a refractive index (nd) of 1.88 or over and an Abbe number (ν d) within a range from 22 to 28 and has a low glass transition point (Tg) and therefore is suitable for precision mold pressing. The optical glass preferably has a yield point within a range from 550° C. to 640° C. The optical glass of the present invention has also excellent resistivity to devitrification and, therefore, is suitable for manufacturing a preform used for precision mold pressing.

DETAILED DESCRIPTION OF THE INVENTION

In the optical glass of the present invention, the above described content ranges of the respective ingredients have been selected for reasons stated below. In the following description, the content ranges of the respective ingredients are expressed in mass percent.

The $SiO_2$ ingredient is an essential ingredient which works as a glass forming ingredient and is effective for improving resistance to devitrification. If the amount of this ingredient is less than 15%, this effect is insufficient whereas if the amount of this ingredient exceeds 25%, the target refractive index (nd) of the present invention cannot be achieved. The amount of this ingredient therefore is limited to the range of 15-25%. A preferable range of this ingredient is 16-24% and a more preferable range thereof is 18-22%.

The $GeO_2$ ingredient is effective for improving resistance to devitrification and therefore may be added to the glass. Since, however, this ingredient is an expensive ingredient, a preferable range of this ingredient is 0-5%. A more preferable range of this ingredient is 0-4% and the most preferable range thereof is 0-2%.

The $B_2O_3$ ingredient is effective for improving resistance to devitrification and lowering the glass transition point (Tg). If the amount of this ingredient exceeds 5%, resistance to devitrification deteriorates rather than improves. The amount of this ingredient therefore is limited to the range of 0-5%. A preferable range of this ingredient is 0-4% and a more preferable range thereof is 0.5-2%.

The $La_2O_3$ ingredient is effective for increasing a refractive index while making the glass to one of a low dispersion characterisitc. This ingredient is also effective for improving resistance to devitrification by coexisting with the $B_2O_3$ ingredient. If, however, the amount of this ingredient exceeds 5%, resistance to devitrification deteriorates rather than improves. The amount of this ingredient therefore is limited to the range of 0-5%. A preferable range of this ingredient is 0-4%.

The $TiO_2$ ingredient is an essential ingredient which is very important for increasing the refractive index (nd). If the amount of this ingredient is less than 5%, this effect is not satisfactory whereas if the amount of this ingredient exceeds 15%, resistance to devitrification deteriorates. The amount of this ingredient therefore is limited to the range of 5-15%. A preferable range of this ingredient is 8-14% and a more preferable range thereof is 10-13%.

The $ZrO_2$ ingredient is effective for increasing the refractive index (nd) and improving chemical durability of the glass. If the amount of this ingredient exceeds 10%, resistance to devitrification deteriorates. The amount of this ingredient therefore is limited to the range of 0-10%. A preferable range of this ingredient is 0-8% and a more preferable range thereof is 2-8%.

The $Nb_2O_5$ ingredient is an essential ingredient which is very important for satisfying the target refractive index of the present invention. If the amount of this ingredient is less than 30%, this effect is not sufficient whereas if the amount of this ingredient exceeds 50%, resistance to devitrification deteriorates. The amount of this ingredient therefore is limited to the range of 30-50%. A preferable range of this ingredient is one which exceeds 30% and is less than 50% and a more preferable range thereof is 32-48%.

The $WO_3$ ingredient is effective for increasing the refractive index (nd) and improving resistance to devitrification. If the amount of this ingredient exceeds 5%, resistance to devitrification deteriortes rather than improves. The amount of this ingredient therefore is limited to the range of 0-0.5%. A preferable range of this ingredient is 0-4% and a more preferable range thereof is 0-3%.

The CaO ingredient is effective for improving resistance to devitrification and adjusting the optical constants. If the amount of this ingredient exceeds 10%, ressitance to devitrification and chemical durability deteriorate. The amount of this ingredient therefore is limited to the range of 0-10%. A preferable range of this ingredient is 0-8% and a more preferable range thereof is 0.5-6%.

The BaO ingredient is effective for improving resistance to devitrification and adjusting the optical constants. If the amount of this ingredient exceeds 10%, ressitance to devitrification and chemical durability deteriorate. The amount of this ingredient therefore is limited to the range of 0-10%. A preferable range of this ingredient is 0-8% and a more preferable range thereof is 1-6%. For improving resistance to devitrification and adjusting the optical constants, a preferable range of total amount of CaO and BaO is 0-12%, a more preferable range of the total amount of these ingredients is. 0.5-10% and the most preferable range thereof is 1-8%.

The $Li_2O$ ingredient is an essential ingredient which is effective for substantially lowering the glass transition point (Tg). If the amount of this ingredient is less than 3%, this effect is insufficient whereas if the amount of this ingredient exceeds 12%, resistance to devitrification deteriortes sharply. The amount of this ingredient therefore is limited to the range of 3-12%. A preferable range of this ingredient is 4-11% and a more preferable range thereof is 5-10%.

The $Na_2O$ ingredient is effective for improving chemical durability by the mixed alkali effect while lowering the glass transition point (Tg). If the amount of this ingredient exceeds 10%, resistance to devitrification deteriortes. The amount of this ingredient therefore is limited to the range of 0-10%. A preferable range of this ingredient is 0-8% and a more preferable range thereof is 0-6%.

The $K_2O$ ingredient is effective for improving chemical durability by the mixed alkali effect while lowering the glass transition point (Tg). If the amount of this ingredient exceeds 10%, resistance to devitrification deteriortes. The amount of this ingredient therefore is limited to the range of 0-10%. A preferable range of this ingredient is 0-8% and a more preferable range thereof is 0-6%. A preferable range of the total amount of the $Li_2O$, $Na_2O$ and $K_2O$ ingredients is 3-32%, a more preferable range thereof is 4-24% and the most preferable range thereof is 6-16%.

The $Bi_2O_3$ ingredient is effective for lowering the glass transition point (Tg) while maintaining a high refractive index (nd). If the amount of this ingredient exceeds 15%, resistance to devitrifcation deteriortes. The amount of this ingredient therefore is limited to the range of 0-15%. A preferable range of this ingredient is 0-12% and a more preferable range thereof is 1-10%.

The $Ta_2O_5$ ingredient may be optionally added since this ingredient is effective for increasing the refractive index and improving resistance to devitrification. Addition of this ingredient exceeding 7%, however, deteriorates, rather than improves, resistance to devitrifification. A more preferable range of this ingredient is 0-5% and the most preferable range thereof is 0-3%.

The $Sb_2O_3$ ingredient may be optionally added for defoaming during melting of the glass materials. Addition of this ingredient up to 1% will suffice.

The optical glass of the present invention should preferably be free of PbO and $F_2$ which are not suitable for an optical glass for precision mold pressing.

The optical glass of the present invention should also preferably be free of $Al_2O_3$ which, if added to the composition of the present invention, would tend to deteriorate resistance to devitrification and rise glass transition point (Tg), which is not suitable for the purpose of the present invention.

EXAMPLES

Examples of the optical glass of the present invention will be described below. The scope of the present invention however is not limited by these examples.

The following Tables 1 to 3 show compositions of Examples Nos. 1-12 of the optical glass of the invention as well as refractive index (nd), Abbe number (v d), glass transition point (Tg) and yield point (At) of these examples.

For manufacturing the optical gleases of Examples Nos. 1-12, conventional raw materials such as oxides, carbonates and nitrates were weighed and mixed at a predetermined ratio to constitute the compositions shown in the tables. These raw materials were put in a platinum crucible, melted at a temperature within a range from 1100° C. to 1300° C. for two to five hours and stirred and homogenized. After lowering the temperature to a proper temperature, the melt was cast into a mold and annealed. As to Examples Nos. 1-12, colorless and transparent glasses were obtained.

TABLE 1

| | Examples | | | | |
|---|---|---|---|---|---|
| | 1 | 2 | 3 | 4 | 10 |
| $SiO_2$ | 20.0 | 21.0 | 21.0 | 24.0 | 18.0 |
| $B_2O_3$ | 1.5 | 2.0 | 2.0 | 0.0 | 5.0 |
| $La_2O_3$ | 0.0 | 3.0 | 3.0 | 0.0 | 4.0 |
| $TiO_2$ | 12.0 | 12.0 | 12.0 | 15.0 | 10.0 |
| $ZrO_2$ | 6.0 | 6.0 | 6.0 | 8.0 | 6.0 |
| $Nb_2O_5$ | 40.4 | 38.9 | 38.9 | 34.0 | 39.9 |
| $WO_3$ | 0.0 | 2.0 | 2.0 | 0.0 | 0.0 |
| CaO | 4.0 | 2.0 | 2.0 | 1.0 | 0.0 |
| BaO | 4.0 | 4.0 | 4.0 | 6.0 | 8.0 |
| $Li_2O$ | 9.0 | 9.0 | 6.0 | 10.0 | 9.0 |
| $Na_2O$ | 0.0 | 0.0 | 0.0 | 0.0 | 0.0 |
| $K_2O$ | 0.0 | 0.0 | 3.0 | 0.0 | 0.0 |
| $Sb_2O_3$ | 0.1 | 0.1 | 0.1 | 0.0 | 0.1 |
| $GeO_2$ | 3.0 | 0.0 | 0.0 | 2.0 | 0.0 |
| Total | 100.0 | 100.0 | 100.0 | 100.0 | 100.0 |
| nd | 1.9011 | 1.9011 | 1.8973 | 1.9091 | 1.9191 |
| vd | 25.2 | 25.2 | 24.4 | 25.9 | 24.0 |
| Tg | 539 | 540 | 552 | 542 | 521 |
| At | 589 | 589 | 601 | 572 | 572 |

TABLE 2

| | Examples | | | |
|---|---|---|---|---|
| | 6 | 7 | 8 | 9 |
| $SiO_2$ | 22.0 | 21.0 | 21.0 | 25.0 |
| $B_2O_3$ | 0.0 | 4.0 | 0.5 | 0.0 |
| $La_2O_3$ | 0.0 | 3.0 | 3.0 | 0.0 |
| $TiO_2$ | 5.0 | 13.0 | 14.0 | 8.0 |
| $ZrO_2$ | 6.0 | 5.0 | 6.0 | 2.0 |
| $Nb_2O_5$ | 48.0 | 36.0 | 38.5 | 50.0 |
| $WO_3$ | 0.0 | 3.0 | 4.0 | 0.0 |
| CaO | 6.0 | 0.0 | 0.0 | 0.0 |
| BaO | 1.0 | 4.0 | 2.0 | 2.0 |
| $Li_2O$ | 9.0 | 4.0 | 5.0 | 5.0 |
| $Na_2O$ | 0.0 | 6.0 | 0.0 | 0.0 |
| $K_2O$ | 0.0 | 0.0 | 6.0 | 8.0 |
| $Sb_2O_3$ | 0.0 | 1.0 | 0.0 | 0.0 |
| $GeO_2$ | 3.0 | 0.0 | 0.0 | 0.0 |
| Total | 100.0 | 100.0 | 100.0 | 100.0 |
| nd | 1.9071 | 1.9069 | 1.9289 | 1.8838 |
| vd | 27.5 | 23.8 | 24.2 | 26.6 |
| Tg | 548 | 523 | 564 | 565 |
| At | 596 | 551 | 633 | 592 |

TABLE 3

| | Examples | | |
|---|---|---|---|
| | 10 | 11 | 12 |
| $SiO_2$ | 21.0 | 21.0 | 20.0 |
| $B_2O_3$ | 2.0 | 2.0 | 1.9 |
| $La_2O_3$ | 3.0 | 3.0 | 3.0 |
| $TiO_2$ | 12.0 | 12.0 | 12.0 |
| $ZrO_2$ | 6.0 | 6.0 | 6.0 |
| $Nb_2O_5$ | 38.9 | 30.4 | 30.0 |
| $WO_3$ | 2.0 | 2.0 | 2.0 |
| CaO | 0.0 | 2.0 | 2.0 |
| BaO | 4.0 | 4.0 | 4.0 |
| $Li_2O$ | 4.0 | 9.0 | 9.0 |
| $Na_2O$ | 4.0 | 0.0 | 0.0 |
| $K_2O$ | 3.0 | 0.0 | 0.0 |
| $Sb_2O_3$ | 0.1 | 0.1 | 0.1 |
| $GeO_2$ | 0.0 | 0.0 | 0.0 |
| $Bi_2O_3$ | 0.0 | 8.5 | 10.0 |
| Total | 100.0 | 100.0 | 100.0 |
| nd | 1.8875 | 1.8965 | 1.9048 |
| vd | 23.9 | 25.1 | 24.8 |
| Tg | 545 | 519 | 520 |
| At | 597 | 568 | 570 |

The glass transition point (Tg) and yield point (At) were obtained from a thermal expansion curve which was obtained by heating a specimen having a length of 50 mm and a diameter of 4 mm by elevating temperature at a constant rate of 4° C. per minute and measuring expansion of the specimen and temperature.

As described above, the optical glass of the present invention has optical constants of a refractive index (nd) of 1.88 or over and an Abbe number (v d) within a range from 22 to 28 and has a glass transition point (Tg) within a range from 500° C. to 580° C. and, therefore, it is suitable for precision mold pressing. Since the optical glass has excellent resistance to devitrification, it is suitable for manufacturing a preform for precision mold pressing of the dropping method.

The optical glass of the present invention is suitable for use as a lens for optical communication for which demand is rapidly increasing in recent years. The lens for optical communication is a glass lens which has functions such as coupling laser beam emitted from an illuminant such as a semiconductor laser to an optical fiber with high efficiency and, therefore, a microoptical part which is indispensable for optical communication. For this lens, a ball glass or an aspherical lens is normally used and this lens is required to have a high refractive index. The optical glass of the present invention is suited for precision mold pressing for producing an aspherical lens.

What is claimed is:

1. An optical glass having a refractive index of (nd) of 1.88 or over and an Abbe number ($v_d$) within a range from 22 to 28, comprising, in mass %,

| | |
|---|---|
| SiO$_2$ | 15-20% |
| B$_2$O$_3$ | 0-5% |
| La$_2$O$_3$ | 0-5% |
| TiO$_2$ | 5-15% |
| ZrO$_2$ | 0-10% |
| Nb$_2$O$_5$ | more than 30% and less than 50% |
| WO$_3$ | 0-5% |
| CaO | 0-10% |
| BaO | 0-10% |
| Li$_2$O | 3-12% |
| Na$_2$O | 0-10% |
| K$_2$O | 0-10% |
| Bi$_2$O$_3$ | 0-15% |
| Ta$_2$O$_5$ | 0-7% | and having a glass transition point (Tg) within a range from 500° C. to 580° C.

2. An optical glass as defined in claim 1 having a yield point (At) within a range from 550° C. to 640° C.

3. An optical glass having a refractive index of (nd) of 1.88 or over and an Abbe number ($v_d$) within a range from 22 to 26, comprising, in mass %,

| | |
|---|---|
| SiO$_2$ | 15-20% |
| B$_2$O$_3$ | 0-5% |
| La$_2$O$_3$ | 0-5% |
| TiO$_2$ | 5-15% |
| ZrO$_2$ | 0-10% |
| Nb$_2$O$_5$ | more than 30% and less than 50% |
| WO$_3$ | 0-5% |
| CaO | 0-10% |
| BaO | 0-10% |
| Li$_2$O | 3-12% |
| Na$_2$O | 0-10% |
| K$_2$O | 0-10% |
| Bi$_2$O$_3$ | 0-15%, | being free of Al$_2$O$_3$ and having a glass transition point (Tg) within a range from 500° C. to 580° C.

4. An optical glass as defined in claim 3 having a yield point (At) within a range from 550° C. to 640° C.

* * * * *